(12) United States Patent
Kikuchi

(10) Patent No.: US 7,418,038 B2
(45) Date of Patent: Aug. 26, 2008

(54) DATA RECEIVING DEVICE

(75) Inventor: Hidekazu Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 616 days.

(21) Appl. No.: 10/933,872

(22) Filed: Sep. 3, 2004

(65) Prior Publication Data

US 2005/0084020 A1    Apr. 21, 2005

(30) Foreign Application Priority Data

Sep. 5, 2003    (JP)    ............... 2003-314821

(51) Int. Cl.
*H04B 3/00*    (2006.01)
(52) U.S. Cl. .................................. 375/257
(58) Field of Classification Search ............... 375/288, 375/289, 294, 345, 346, 282, 257, 333; 341/68, 341/69
See application file for complete search history.

(56) References Cited

U.S. PATENT DOCUMENTS

| | | | |
|---|---|---|---|
| 6,577,689 B1 * | 6/2003 | Smith et al. .................. | 375/354 |
| 2004/0096004 A1 * | 5/2004 | Wang ........................... | 375/257 |

FOREIGN PATENT DOCUMENTS

| JP | 5 7230 | 1/1993 |
|---|---|---|
| JP | 2000 124959 | 4/2000 |
| JP | 2001 16289 | 1/2001 |

OTHER PUBLICATIONS

Takao Ikeuchi et al., High-speed line driver receiver IC, NEC technical report, Dec. 24, 1993, vol. 46, No. 12, pp. 1-6.

* cited by examiner

*Primary Examiner*—David C. Payne
*Assistant Examiner*—Rahel Guarino
(74) *Attorney, Agent, or Firm*—Frommer Lawrence & Haug LLP; William S. Frommer; Paul A. Levy

(57) ABSTRACT

A data receiving device includes a reference clock signal transmitted through a differential conductor pair, estimating attenuation characteristics in the differential conductor pair serving as a transmission path of the reference clock signal, and compensating a transmission path attenuation of an NRZ signal based on the estimated attenuation characteristics. Because the reference clock repeats a transition between 0 and 1 at the same period as NRZ data period without fail, it is possible to estimate high frequency attenuation characteristics of a conductor by observing the amplitude of the reference clock at the receiving end. Characteristic control of a compensation filter is performed with respect to the NRZ signal to reproduce a proper transmission signal from a signal waveform that has been deteriorated by the attenuation caused in a long-distance transmission of high-speed digital data using the differential cable.

4 Claims, 17 Drawing Sheets

FIG.4A
0 0 | 1 | 0 | 1 1 | 0 0
FIG.4B
1 1 | 0 | 1 | 0 0 | 1 1
FIG.4C
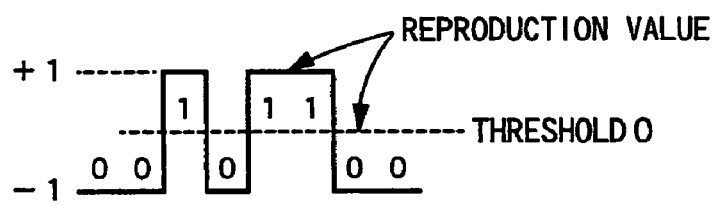
FIG.4D
0 0 | 1 | 0 | 1 1 | 0 0
FIG.4E
1 1 | 0 | 1 | 0 0 | 1 1
FIG.4F
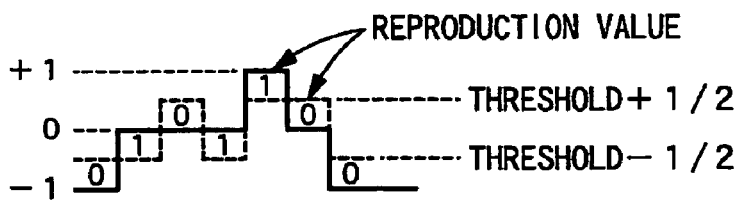

DATA RECEIVING DEVICE

BACKGROUND OF THE INVENTION

1. Field of the Invention

The present invention relates to a data receiving device, and more specifically, to a data receiving device that reduces influences of a signal attenuation and propagation skew generated when high-speed digital data is transmitted through a differential cable.

2. Description of the Related Art

A digital data transmission system that propagates, as a differential signal, a clock or NRZ data through paired conductor such as a twisted-pair cable has many advantages: it has a feature of being invulnerable to fluctuation in potential difference of a transceiver, it can eliminate external noise by means of common-mode voltage elimination function of a differential receiving circuit; and it can reduce unnecessary radiation. Therefore, the digital data transmission system is widely used for high-speed data transmission in the medium range (about 10 to 100 meters).

In the conductor, there inevitably occurs a limited signal attenuation per unit of transmission length. This attenuation becomes prominent at high frequency due to skin effect. Accordingly, a long transmission distance and high transmission data rate conflict with each other. In order to eliminate the conflict, a technique in which an equalizer is provided on the receiving side to compensate an attenuation in a transmission path to allow a receiver to reproduce the signal that seems not to have experienced an attenuation of the conductor is available. In this case, since attenuation amount changes depending on the conductor serving as a transmission path, an active circuit with variable frequency characteristics is used for wider application (refer, for example, to Jpn. Pat. No. 2830087). Further, a technique of automatically adjusting the characteristics is available (refer, for example, to Jpn. Pat. Appln. Laid-Open Publication No. 11-122041).

However, the above adaptive equalizer has been designed on the assumption that the NRZ data probabilistically transits with frequency. Therefore, reception fault tends to occur for specific transition pattern such as long string of 0s, which may often appear in actual data.

There exists another factor that contributes to the conflict between a transmission distance and transmission data rate in the transmission of differential signal through the paired conductor such as a twisted-pair cable.

Since there is a difference in physical length or dielectric constant of coating in the conductor pair by necessity, a limited difference is made also in propagation delay time. In the differential signal that has been propagated through the conductor pair, a phenomenon in which positive and negative signals reach the receiving end with time difference is generated. This phenomenon is referred to "skew", and the skew causes inter-symbol interference in which the transmission signal misaligned in time is superposed on a receiving end differential signal. In the case of widely used twisted-pair cables, it is not uncommon that skew of up to 10 ps is observed per 1 m. When the skew exceeds ¼ of NRZ bit period, proper data reception cannot be realized simply by detecting zero cross of the differential signal with a simple comparator. Therefore, the distance at which 2 Gbps signals having a bit period of 500 ps can be transmitted using a differential transfer is limited to about 12.5 m.

For example, FIG. 1 shows attenuation characteristics of a typical cable. In FIG. 1, transmission signals of image data are used. Although attenuation characteristics differ depending on formats such as UXGA, SXGA, XGA, amplitude attenuations of any of signals become large with increasing cable length. FIG. 2 shows skew characteristics between a typical cable pair. It is said that twist tension control or adjustment at the time of assembling the connector can reduce the skew to about ⅓. However, the skew increases with increasing cable length.

In order to overcome the above constraints and realize an effective transmission, it is necessary to adjust, for each cable pair, propagation delay of the positive and negative signal lines of the twisted-pair cable. As the circuit that removes inter-symbol interference caused by skew, the equalization technique using a transversal filter related to an optical disk data reproduction disclosed in Jpn. Pat. No. 3208865 or the equalization technique using a multi-threshold comparator related to optical fiber communications disclosed in Jpn. Pat. Appln. Laid-Open Publication No. 11-243428 can be employed.

However, even when the above techniques are employed, in order to manufacture the receiving device capable of widely coping with the skew amount that varies depending on the cable, delicate and complicated control needs to be performed so that additional weighting factor of the transversal filter or threshold of the multi-threshold comparator can be properly equalized, in consideration of inter-symbol interference caused by the skew amount and high frequency attenuation due to the aforementioned skin effect. Further, the transversal filter or multi-threshold comparator is a high-speed circuit that operates at an NRZ transmission speed. Therefore, in order to realize a high-speed data transmission, the transversal filter or multi-threshold comparator must be operated at high-speed and with high accuracy, resulting in large power consumption of the receiving device.

SUMMARY OF THE INVENTION

An object of the present invention is to provide a data receiving device having a low error rate, capable of reproducing an accurate transmission signal from a waveform of a differential received signal that has been deteriorated by the attenuation with frequency characteristics and propagation skew due to positive and negative asymmetry of a differential pair generated in the cable, in a long-distance transmission of high-speed digital data using a differential cable.

According to an aspect of the present invention, there is provided a data receiving device that receives a reference clock signal transmitted through a differential conductor pair and an NRZ signal transmitted through a differential conductor pair equivalent to the differential conductor pair through which the reference clock signal is transmitted, comprising: an estimation means for estimating attenuation characteristics in the differential conductor pair serving as a transmission path of the reference clock signal; and a compensation means for compensating a transmission path attenuation of the NRZ signal based on the attenuation characteristics estimated by the estimation means. As a result, the data receiving device compensates an amplitude attenuation and propagation skew generated in propagation through the differential conductor pair.

The data receiving device includes a first comparison means for comparing a differential voltage whose transmission path attenuation has been compensated by the compensation means and a first threshold voltage; a second comparison means for comparing a differential voltage whose transmission path attenuation has been compensated by the compensation means and a second threshold voltage; a selection means for selecting, as a reproduction signal of the NRZ signal the comparison result of either the first comparison means or second comparison means; a delay means for delaying the reproduction signal selected by the selection means based on a predetermined sampling clock signal; and a control means for controlling the signal selection in the selection means in accordance with a delay amount in the delay means. It is preferable that the data receiving device be provided with a phase synchronization means for phase-synchronizing the reproduction signal of NRZ signal selected by the selection means and a clock signal frequency-synchronized with the reference clock signal.

According to anther aspect of the present invention, there is provided a data receiving device that receives an NRZ signal transmitted through a differential conductor pair, comprising: a multiplication means for receiving and multiplying a frequency-divided signal of a clock of the NRZ signal; an estimation means for estimating attenuation characteristics in the differential conductor pair serving as a transmission path of the frequency-divided signal; a compensation means for compensating a transmission path attenuation of the NRZ signal based on the attenuation characteristics estimated by the estimation means; a first comparison means for comparing a differential voltage whose transmission path attenuation has been compensated by the compensation means and a first threshold voltage; a second comparison means for comparing a differential voltage whose transmission path attenuation has been compensated by the compensation means and a second threshold voltage; a selection means for selecting, as a reproduction signal of the NRZ signal, the comparison result of either the first comparison means or second comparison means; a delay means for delaying, as a reference clock signal, a signal obtained by multiplying, using the multiplication means, the reproduction signal selected by the selection means; and a control means for controlling the signal selection in the selection means in accordance with a delay amount in the delay means. As a result, the data receiving device compensates an amplitude attenuation and propagation skew generated in propagation through the differential conductor pair.

According to the present invention, it is possible to stably compensate a high frequency attenuation caused by a differential transmission without being influenced by the transition pattern of NRZ data. Further, it is possible to reproduce proper NRZ data even in the case where skew, which has been generated by delay time difference between positive and negative signals in the differential conductor pair, is large enough to exceed the bit period of the NRZ data. Since a differential receiving circuit is used as the initial stage of the receiving circuit, the data in which common-mode noise has been removed and thus having a low error rate can be received. Further, even in the case where skew amount is unpredictable and widely distributed, the compensation is adaptively performed. For the adaptive compensation, it is unnecessary to provide a transversal filter or threshold control comparator, allowing a data transmission with low power consumption.

BRIEF DESCRIPTION OF THE DRAWINGS

FIGS. 4A to 4F are views for explaining the principle of the skew compensation; FIG. 4A shows a positive receiving end signal; FIG. 4B shows a negative receiving end signal; FIG. 4C shows a differential signal of the positive and negative receiving end signals; FIG. 4D shows the positive receiving end signal delayed by one bit period; FIG. 4E shows the negative receiving end signal; and FIG. 4F shows the differential signal in the case where the positive receiving end signal has been delayed by one bit period;

DETAILED DESCRIPTION OF THE PREFERRED EMBODIMENTS

Figure 1:
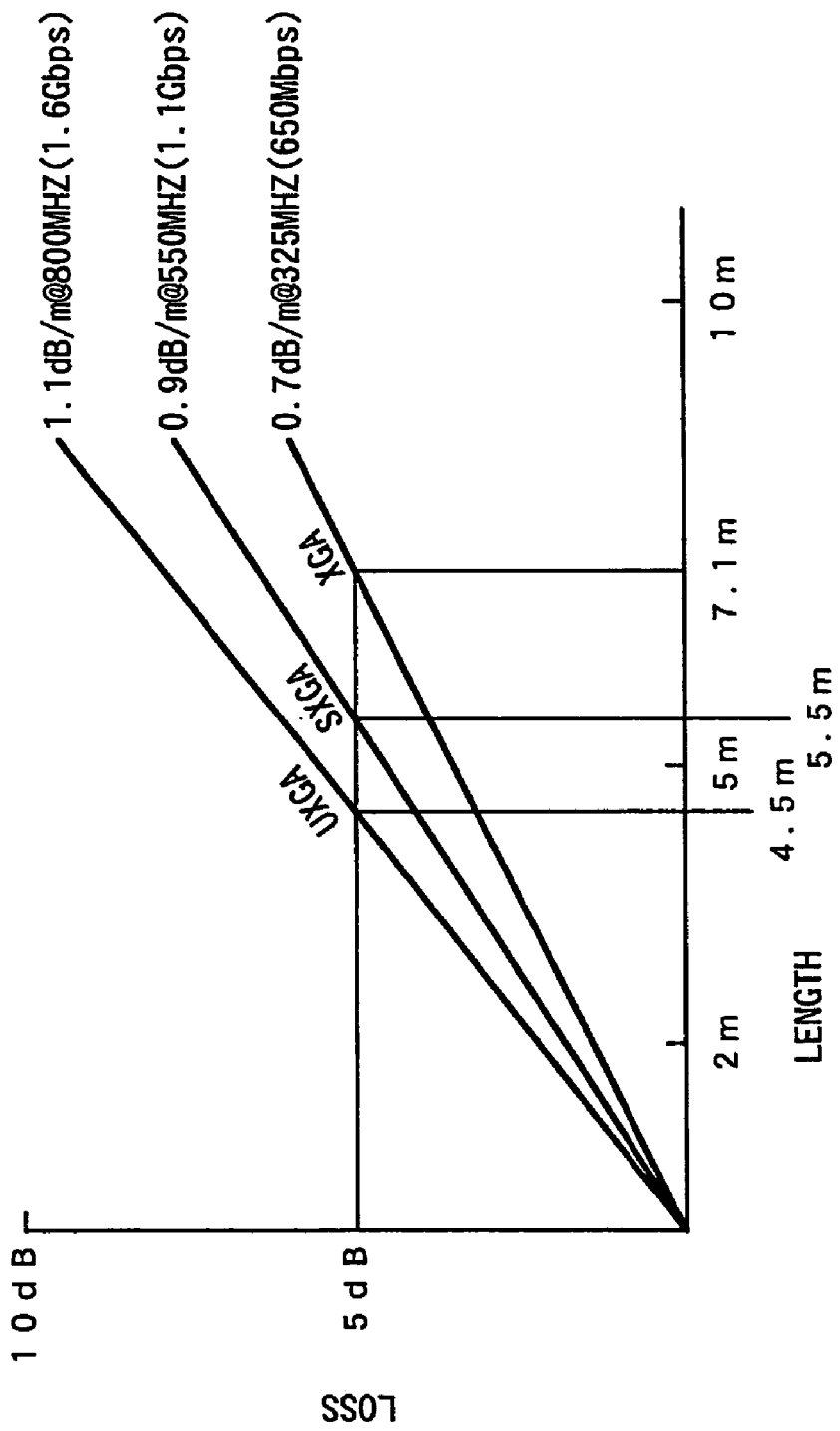
FIG. 1 is a view for explaining attenuation characteristics of a typical cable.
Figure 2:
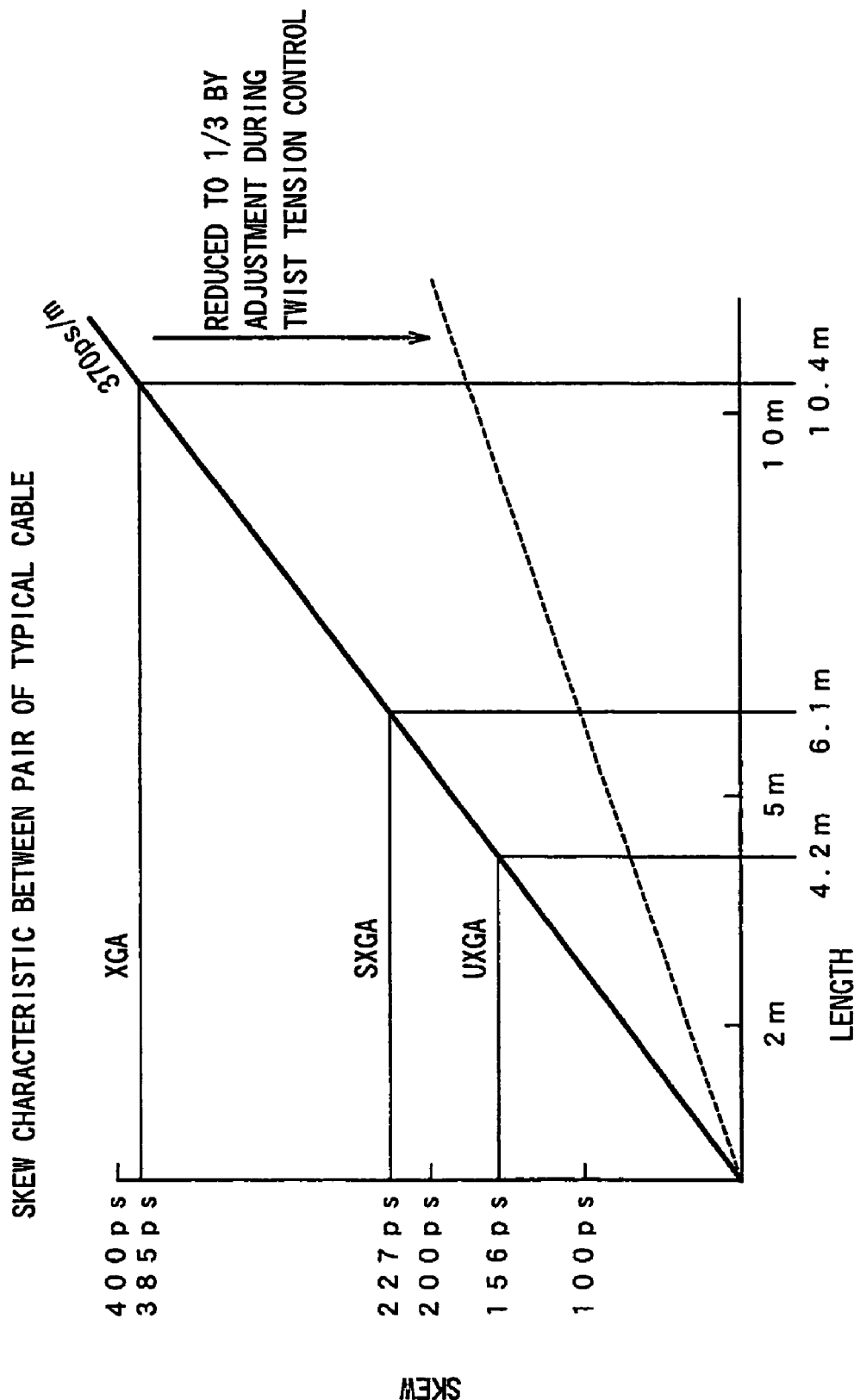
FIG. 2 is a view for explaining skew characteristics between a pair of typical cables.

The present invention is featured in that control of characteristics of a compensating filter with respect to an NRZ signal is performed based on estimation of attenuation characteristics of a reference clock in order to allow an adaptive equalizer that can compensate a high frequency attenuation to properly operate even when long string of 0s are transferred. Since the reference clock repeats a transition between 0 and 1 at the same period as an NRZ data period, or at an integral multiple of the NRZ data period, it is possible to estimate high frequency attenuation of a conductor by observing amplitude of the reference clock at the receiving end. In a data transmission, conductors having substantially the same characteristics are used to transmit the reference clock and NRZ data. Even if difference of about 10 mm is made between the conductors in manufacturing, difference in the attenuation between the reference clock and NRZ data is vanishingly small. Therefore, even if the NRZ signal has any transition patterns, it is possible to stably compensate the high frequency attenuation without being influenced by the transition patterns by supplying an NRZ signal receiving section with the estimated amount.

To compensate propagation time skew between positive and negative signals of the differential conductor pair, the present invention uses a switching means. More specifically, the differential voltage obtained by compensating a high frequency attenuation is input to two comparators, followed by being compared with two threshold voltages. The switching means then selects which output of the two comparators is employed as a reproduction value of the NRZ data. The switching operation in the switching means is performed depending on an FF that transfers the reproduction value of the NRZ data using a sampling clock and its resistor value.

The principle of the skew compensation will be described with reference to FIG. 4. Assuming that an NRZ data 0 0 1 0 1 1 0 0 is given to the positive signal line of the differential conductor pair at the transmitting end, the data with inverse bit stream 1 1 0 1 0 0 1 1 is given to the negative signal line. If these data reach the receiving end without skew between the positive and negative signals, the positive signal at the receiving end becomes as shown in FIG. 4A, and the negative signal at the receiving end becomes as shown in FIG. 4B. Since the differential signal thus obtained becomes a binary signal −1 −1 +1 −1 +1 +1−1 −1 as shown in FIG. 4C, the transmitted signal can be reproduced by determining the binary signal with 0 being as a threshold.

However, in the case where the negative signal reaches the receiving end later than the positive signal by a bit period due to the skew generated between the positive and negative signals, the positive and negative signals at the receiving end become as shown in FIGS. 4D and 4E, respectively. The differential signal in this case becomes three-valued signal −1 0 0 0 +1 0 −1 as shown in FIG. 4F. Therefore, signal cannot be reproduced by using 0 as a threshold.

Figure 5:
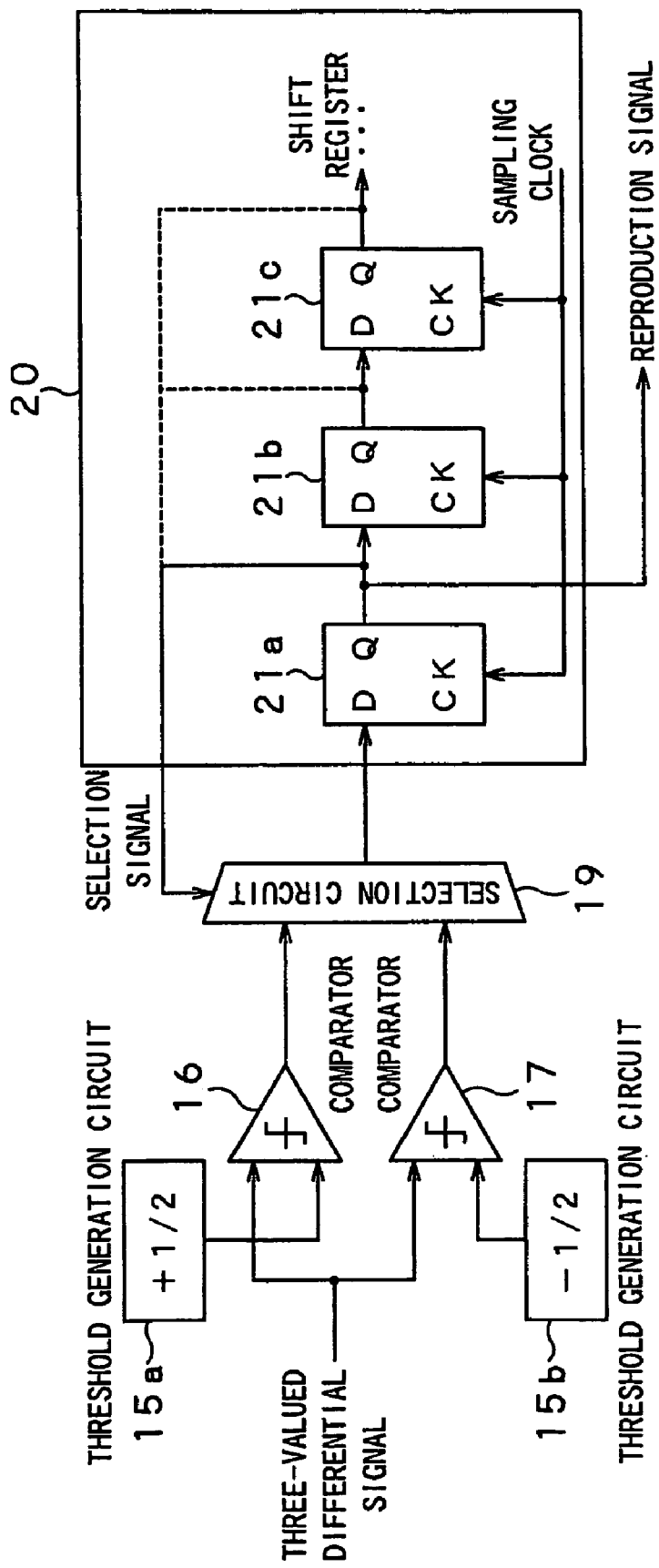
FIG. 5 is a block diagram for explaining an FF that stores a reproduction value.

In order to cope with the above problem, the present invention uses two thresholds of +½ and −½ denoted by dotted lines in FIG. 4F to determine a reproduction value. As a result, the signal can be reproduced properly. The threshold to be employed is determined based on the prior reproduction value. That is, −½ is used when the prior reproduction value is 0, and +½ is used when the prior reproduction vale is 1. To do this, a shift resistor for storing the reproduction value is provided. This sampling circuit and shift resister 20 is shown in FIG. 5.

In the sampling circuit and sift resister 20, a select circuit 19 selects an output of the comparators having thresholds differ depending on the output value. If the skew amount is increased to correspond to 2 to 3 bit periods or more, it is only necessary to set a tap position of an FF (flip-lop) for picking-up the selection signal at the latter stage.

Further, in the present invention, a clock phase frequency-synchronized with the reference clock signal is phase-synchronized with respective NRZ signal data transitions to obtain a sampling clock to fetch the reproduction signal, thereby accurately performing signal reproduction by means of skew compensation. The received differential signal obtained by compensating a high frequency attenuation is basically the aforementioned three-valued signal. To be more precise, the differential signal exhibits an eye pattern as shown in FIG. 6.

Figure 6:
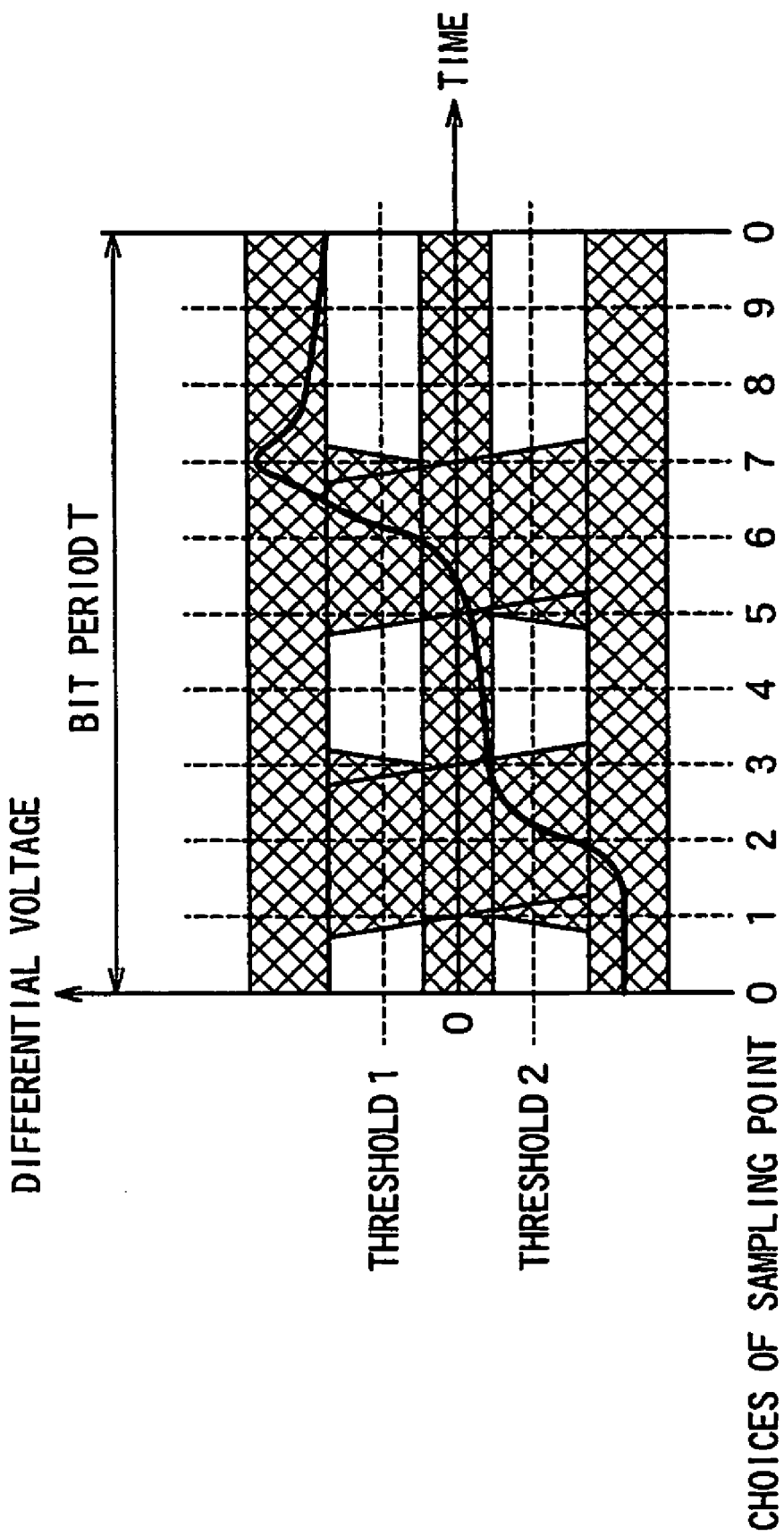
FIG. 6 is a view for explaining an eye pattern formed by received differential signals whose high frequency attenuations have been compensated.

In FIG. 6, a heavy line denotes a differential voltage curve at a given bit period T, a shaded region denotes a transition region including all the voltage curves, and chain lines denote choices of sampling points to be provided within a bit time. Here, ten choices are prepared. The ranges between choices 1 and 3, and between choices 5 and 7 correspond to the time zone at which either of positive or negative receiving end voltage of the respective differential conductor pair transits.

In an actual data transmission, not only jitter exists on the sending end itself, but also noise added to the sending signal or incompleteness of the compensation of a high frequency attenuation provides jitter to the receiving end signal. Therefore, the data that has been fetched before and after the transition may be present, in a mixed manner, in the sample voltages sampled at sampling points 1, 2, 3, 5, 6, and 7, on which intersecting points with the thresholds are located within the transition region. Since that which precedent data bit is superposed on the differential skew differs between before and after the transition, it is impossible to determine from which tap of the FF the selection signal, which selects the reproduction signal from two comparators 16 and 17 having different thresholds, should be picked up. As a result, proper signal reproduction cannot be realized.

In the present invention, the sampling point is selected from choices 4, 8, 9, 0 as shown in FIG. 6. More preferably, the sampling point is locked (fixed) to choice 9 which is most apart from transition region in terms of time, and is therefore stable, thereby avoiding the above problem.

EXAMPLE 1

Figure 3:
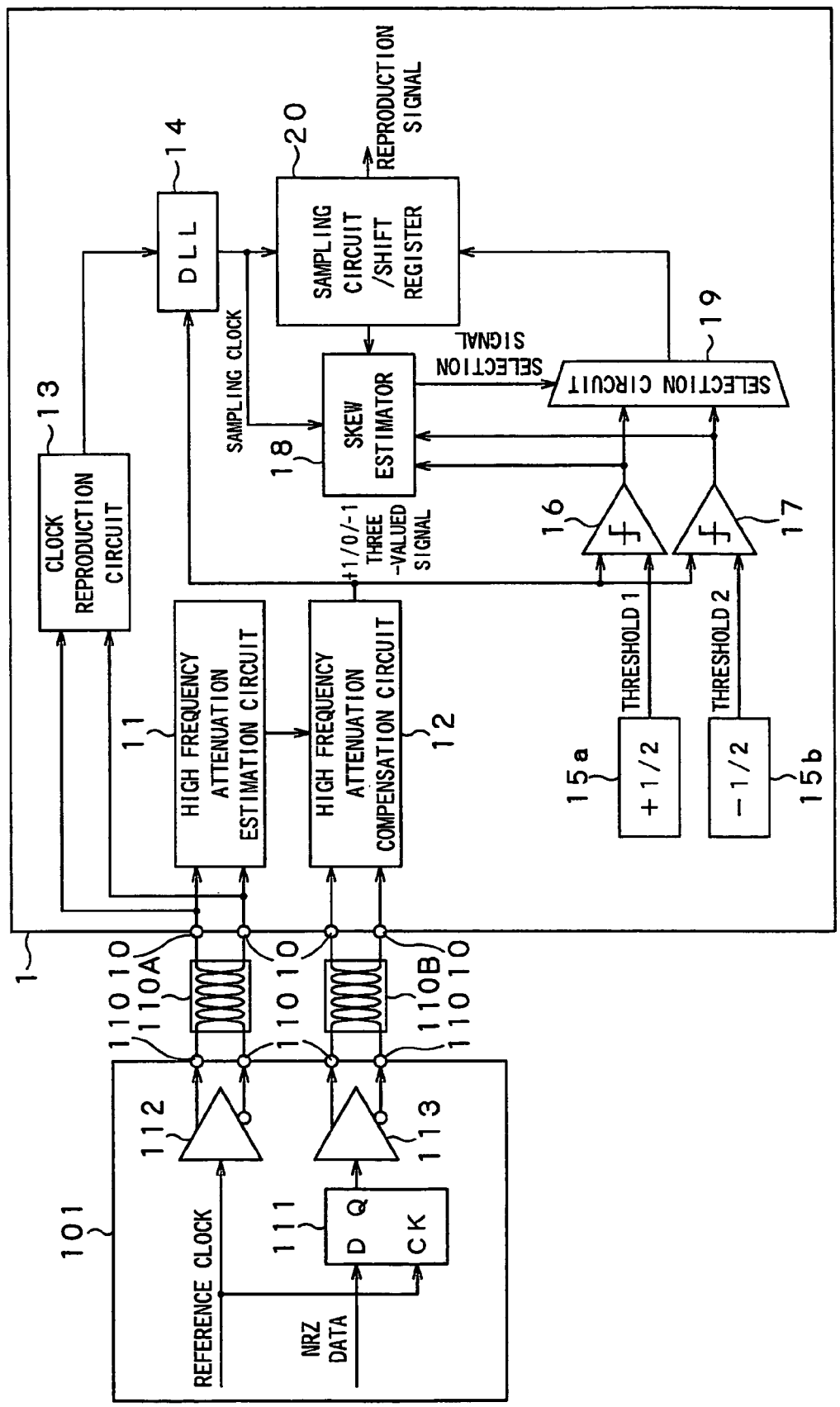
FIG. 3 is a block diagram for explaining a data receiving device shown as a concrete example of the present invention.

A concrete example of the present invention will be described in detail with reference to the accompanying drawings. FIG. 3 shows a data receiving device 1 according to the first concrete example of the present invention.

A data transmitting device 101 that transmits data to a data receiving device 1 outputs NRZ data in synchronization with a reference clock by means of an FF (flip-flop) 111. The amplifiers 112 and 113 amplify the reference clock and NRZ data, respectively, and generate inversion signals. The amplified reference clock and NRZ data are then transmitted to differential conductor pairs (e.g., twisted-pair cable) through a transmitting end 110.

The data receiving device 1 includes receiving ends 10 to be connected to a differential conductor pair 110A that transmits the reference clock and a differential conductor pair 110B that transmits the NRZ data. The receiving ends of the differential conductor pair 110A are connected to an input of a high frequency attenuation estimation circuit 11 and a clock reproduction circuit 13, respectively. The high frequency attenuation estimation circuit 11 estimates amount of high frequency attenuation characteristics and outputs the calculated amount to a high frequency attenuation compensation circuit 12. The receiving ends of the differential conductor pair 110B that transmits the NRZ data are connected to an input of the high frequency attenuation compensation circuit 12. The high frequency attenuation compensation circuit 12 compensates the received signal based on the estimated amount of high frequency attenuation characteristics.

Comparators 16 and 17 compare the output of the high frequency attenuation compensation circuit 12 with respective thresholds supplied from the different threshold generation circuits 15a and 15b. The outputs of the respective comparators are supplied to a selection circuit 19. The one that has been selected by the selection circuit 19 is adopted as a reproduction signal. A selection signal to be supplied to the selection circuit 19 is the one that has been determined to be optimum, by a skew estimator 18, among a plurality of tap outputs of a sampling circuit and shift register 20 that samples a reproduction signal with a predetermined sampling clock and time-shifts the signal. The skew estimator 18 determines the optimum selection signal while monitoring the outputs of two comparators 16 and 17 at all times. A clock reproduction circuit 13 reproduces a clock from the receiving end signal of the reference clock, and inputs the clock to a DLL 14. The DLL 14 generates a sampling clock whose phase has been adjusted with respect to a transition point of the output of the high frequency attenuation compensation circuit 12, and supplies the sampling circuit and shift register 20 and skew estimator 18 with the sampling clock.

Subsequently, a description will be given in detail of the high frequency attenuation estimation circuit 11 and high frequency attenuation compensation circuit 12 with reference to FIG. 7. The high frequency attenuation estimation circuit 11 amplifies the reference clock input from the differential conductor pair 110A by means of an amplifier 22 and enhances a high frequency component through a high frequency enhancement filter 23. The reference clock whose high frequency component has been enhanced is gain-controlled by a gain variable amplifier 24. An adder 25 performs weighted addition to the reference clock, which is then passed through an amplitude detection circuit 26 and loop filter 27, and is given a controlled variable of weight defined by the result of feedback.

Figure 7:
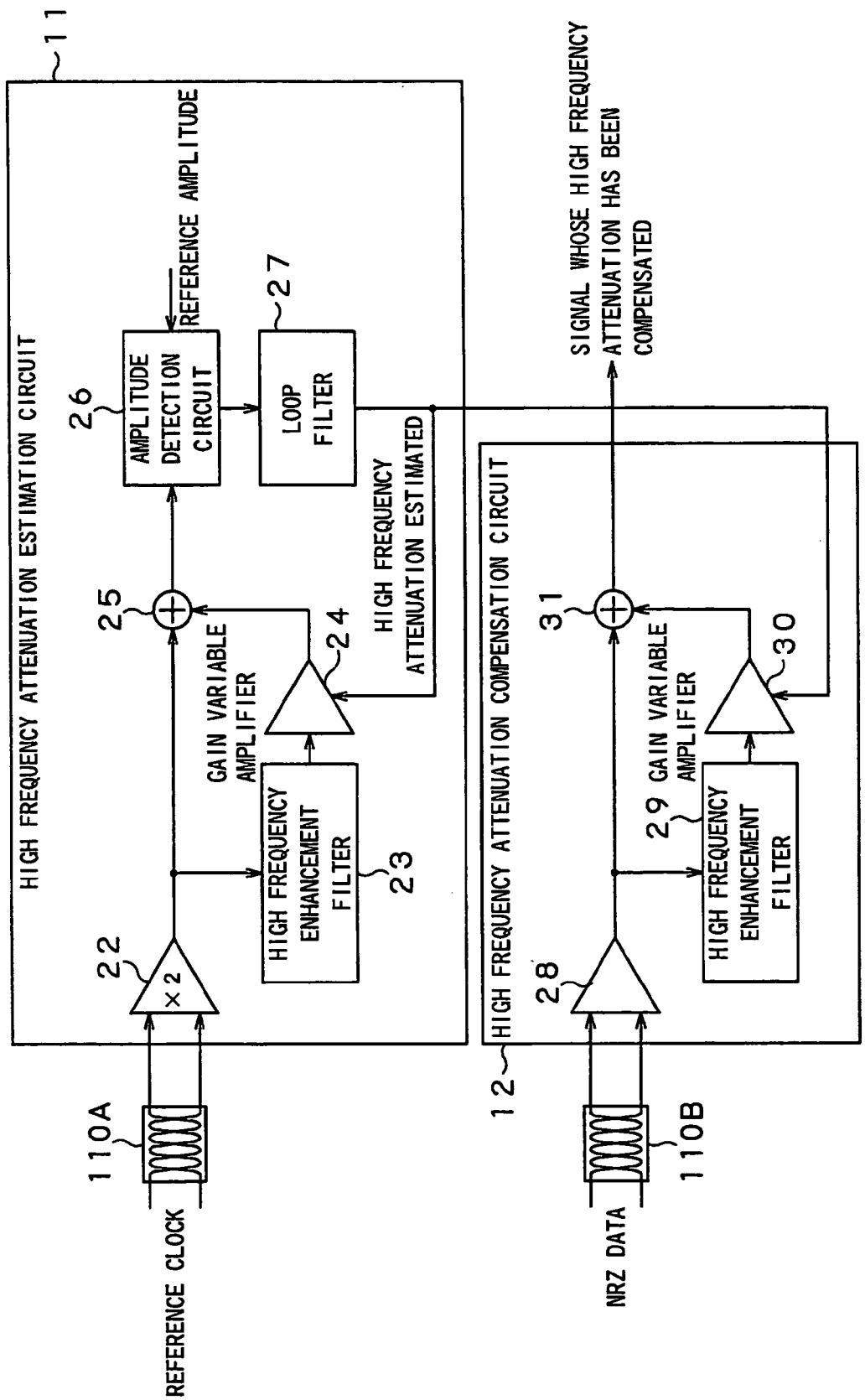
FIG. 7 is a block diagram for explaining a high frequency attenuation characteristics estimation circuit that applies an AGC circuit.

That is, the high frequency attenuation estimation circuit 11 shown in FIG. 7 applies an AGC (Auto Gain Control) circuit. The high frequency attenuation estimation circuit 11 weights and adds the signal whose high frequency component that had been attenuated during transmission has been enhanced to the receiving end signal of the reference clock, and feedback-controls the weight so that the result of the weighted addition corresponds to the original amplitude before being subjected to a transmission path attenuation. Therefore, the control variable of the weight corresponds to the result of estimating the high frequency attenuation characteristics of the differential conductor pair 110A that has transmitted the reference clock.

The high frequency attenuation compensation circuit 12 amplifies the NRZ data input from the differential conductor pair 110B by means of an amplifier 28, and enhances a high frequency component through a high frequency enhancement filter 29. The high frequency attenuation characteristics of the differential conductor pair 110B that transmits the NRZ data are close to the characteristics of the reference clock. Therefore, a high frequency enhancement filter 29 and adder 31 for weighting similar to those used in the aforementioned feedback loop are provided also at the receiving side to gain-control the signal whose high frequency component has been enhanced by giving a control variable of the weight defined by the result of feedback to a gain variable amplifier 30. As a result, an output of the adder 31 becomes the signal in which a high frequency attenuation due to the conductor has been compensated.

The high frequency attenuation estimation circuit 11 shown in FIG. 7 does not uses differential signal of the reference clock, but uses the positive signal by itself. This is because modulation of amplitude due to the skew between the positive and negative signal lines is generated in the differential signal at the receiving end of the reference clock, and this influence must be eliminated. In this case, there is a possibility that the AGC circuit cannot separate a component that could be eliminated as common mode noise if the AGC circuit receives it as a differential signal, and carries the component into AGC circuit. However, the influence of such noise can be eliminated by making time constant of the AGC loop sufficiently long to average the influence.

A description will be given of the skew estimator 18 with reference to FIGS. 8 to 10. The object of the skew estimator 18 is to estimate the number of clocks corresponding to the skew included in the difference voltage between the positive and negative signals that corresponds to the sample value of the reproduction signal captured by the sampling clock.

Here, an example of method of estimating the original signal from the differential signal having skew will be described. It is assumed that NRZ signal p (t) and its inversion signal n (t) having cycle T as shown in equations (1) and (2) are present at the transmitting end.

$$p(t)=S_n; \ nT \leq t < (n+1)T \quad (1)$$

$$n(t)=1-S_n; \ nT \leq t < (n+1)T \quad (2)$$

Assuming that skew T is generated when these signals pass through transmission lines respectively and reach the receiving end, the differential signal r (t) at the receiving end is represented by equation (3), and when the equation (3) is sampled with period T, sampling signal $R_n$ is represented by equation (4).

$$r(t)=p(t)-n(t-\tau) \quad (3)$$

$$R_n=S_n-(1-S_{n-m})=S_n+S_{n-m}-1 \quad (4)$$

Where, m is an integer immediately before or after τ/T. When m=0, $R_n$ is represented by the following equation (5). Therefore, to estimate $S_n$ based on $R_n$ in consideration of noise mixture during transmission of p (t) and m (t), 0 is set as threshold for $R_n$. When $R_n$ is close to +1, $S_n$ is estimated to be 1. When $R_n$ is close to −1, Sn is estimated to be 0.

$$\text{When m=0, } R_n=2S_n-1=+1(S_n=1) \text{ or } -1(S_n=0) \quad (5)$$

When m≠0, $R_n$ is represented by the following equation (6). In this case, the estimation of $S_{n-m}$ has been completed at the point of estimation of $S_n$. Therefore, it can be seen from equation (6) that when the estimation value of $S_{n-m}$ is 1, the estimation of $S_n$ is performed with threshold +½ for $R_n$, and when the estimation value of $S_{n-m}$ is 0, the estimation of $S_n$ is performed with threshold −½ for $R_n$.

When m≠0, $$R_n = S_n + S_{n-m} - 1 = +1(S_n=1, S_{n-m}=1)$$

$$\text{or } 0(S_n=0, S_{n-m}=1 \text{ or } S_n=1, S_{n-m}=0)$$

$$\text{or } -1(S_n=0, S_{n-m}=0) \quad (6)$$

The above relations are shown in the following table.

TABLE 1

| Estimation value of $S_{n-m}$ | $S_n$ | $R_n$ | Estimation of $S_n$ based on $R_n$ |
|---|---|---|---|
| 1 | 1 | +1 | When $R_n$ > threshold +½, $S_n$ = 1 |
|   | 0 | 0  | When $R_n$ < threshold +½, $S_n$ = 0 |
| 0 | 1 | 0  | When $R_n$ > threshold −½, $S_n$ = 1 |
|   | 0 | −1 | When $R_n$ < threshold −½, $S_n$ = 0 |

Since the value of $S_{n-m}$ that has previously been estimated is used for the estimation of $S_n$, an error of the initial estimation may lead to all estimation error. However, n shown in the following equations (7) and (8) is present unless NRZ signal $S_n$ is signal that repeats at a constant rate.

$$S_{n-m}=S_n=1 \quad (7)$$

$$S_{n-m}=S_n=0 \quad (8)$$

Since $R_n$=1 in the case of the equation (7), the $S_n$ is estimated to be 1 irrespective of whether the threshold is +½ or −½, resulting in proper estimation. Similarly, since $R_n$=−1 in the case of the equation (8), the $S_n$ is estimated to be 0 irrespective of whether the threshold is +½ or −½, resulting in proper estimation. When the proper estimation value is used as the previous estimation value $S_{n-m}$ in the next estimation, proper estimation can be performed even when the equations (7) and (8) are not satisfied.

Figure 8:
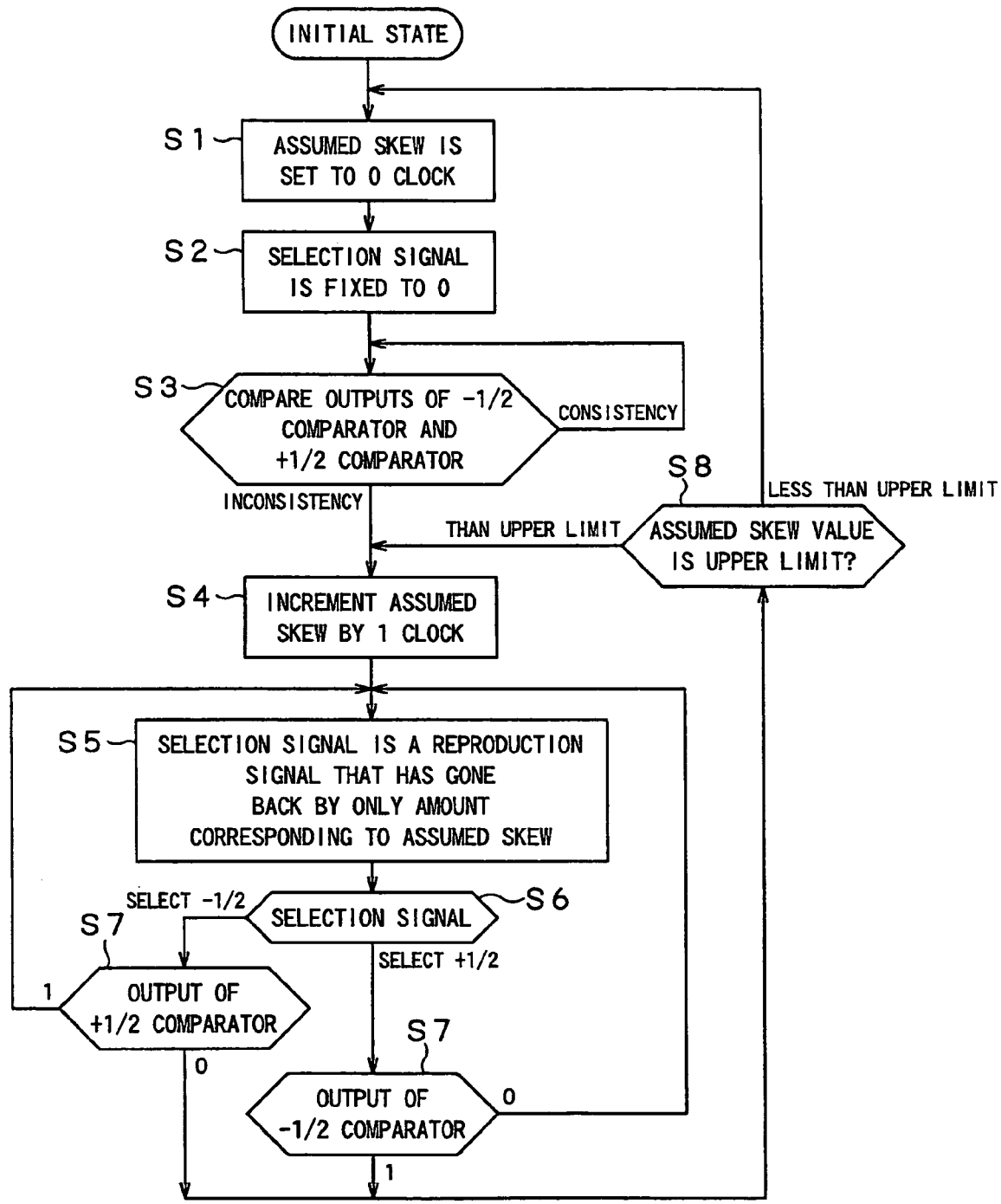
FIG. 8 is a flowchart for explaining the operating principle of a skew estimator of the data receiving device.

FIG. 8 shows a skew estimation method in the skew estimator 18 based on the above estimation method.

The skew estimator 18 assumes, in step S1, that skew is 0 clock at the initial state. In this assumption, both of the output values from the two comparators 16 and 17 may be adopted as a reproduction value. Because the output of the high frequency attenuation compensation circuit 12 at the sample point is always +1 or −1 as shown in FIG. 4C.

The skew estimator 18 fixes a selection signal to 0 or 1 while skew is assumed to be 0 (in this case, fixes the selection signal to 0) in step S2. Subsequently, in step S3, the skew estimator 18 monitors whether inconsistency exists between the outputs from the two comparators 16 and 17.

When the inconsistency is detected in step S3, the skew estimator 18 abandons the assumption that skew is 0 clock, and reassumes that skew is 1 clock in step S4.

At this time, the output from the high frequency attenuation compensation circuit 12 and the selection of the threshold output from the skew estimator 18 transit as shown in FIG. 4F. In step S6, when the skew estimator 18 adopts $-\frac{1}{2}$ as a threshold, the expected output of the high frequency attenuation compensation circuit 12 is −1 or 0, and +1 is impossible. Conversely, when the skew estimator 18 adopts $+\frac{1}{2}$ as a threshold, the expected output of the high frequency attenuation compensation circuit 12 is +1 or 0, and −1 is an impossible value.

That is, in step S7, when the skew estimator 18 that monitors the outputs of the two comparators 16 and 17 detects the improper values, the skew estimator 18 abandons the assumption that the skew is 1 clock, and proceeds to step S8. In step S8, the skew estimator 18 determines whether the assumed skew value is upper limit or not. When the assumed skew value is less than the upper limit, the estimator 18 returns to step S1. When the assumed skew value reaches the upper limit, the skew estimator 18 returns to step S4 and re-assumes that the skew is 2 clock by adding 1 to the current assumed skew value.

In the following, the skew estimator 18 increments the assumed value every time improper values of the outputs from the comparators 16 and 17 are detected. When the upper limit of the skew previously prepared in a hardware is abandoned, the skew is again assumed to be 0 and the above processing is repeated.

Figure 9:
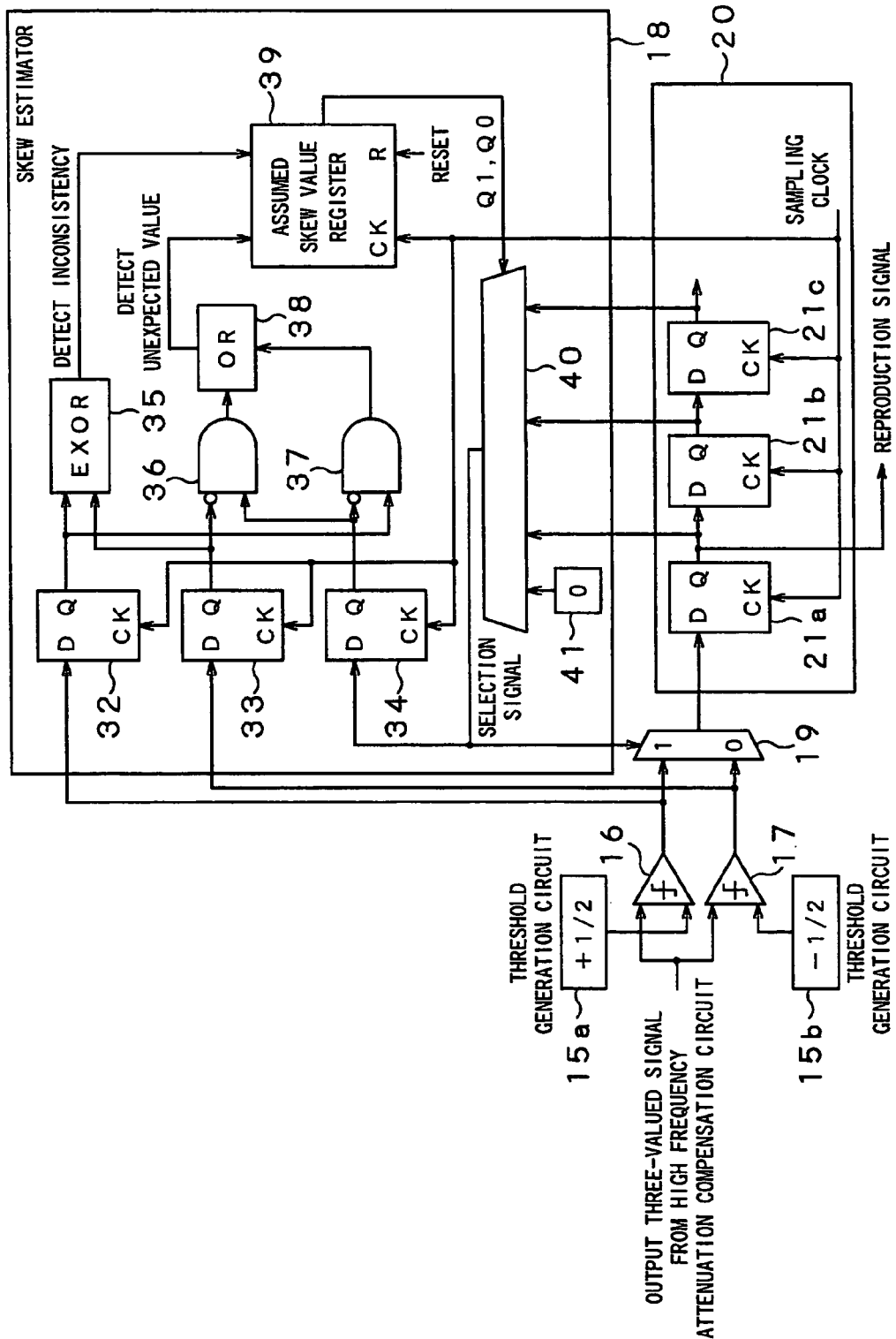
FIG. 9 is a block diagram for explaining a configuration of a skew estimator of the data receiving device.

FIG. 9 shows an example of a circuit configuration of the skew estimator 18 that implements the above skew estimation processing shown in FIG. 8. The skew estimator 18 includes FF (flip-flop) 32, FF 33, and FF 34, and is connected to the outputs of the comparators 16 and 17. The comparison result is input to input D of FF 32. Q of FF 32 is input to ExOR gate 35 and AND gate 37. The comparison result of the comparator 17 is input to input D of FF 33. Q of FF 33 is input to the ExOR gate 35 and is inversely input to the AND gate 36. The result of a selection circuit 40 to be described later is input to input D of FF 34. Q of FF 34 is input to the AND gate 36 and is inversely input to AND gate 37. The outputs of AND gate 36 and AND gate 37 are connected to OR gate 38.

Therefore, the signal output from the ExOR gate 35 denotes the detection of inconsistence in step S3. In this case, an assumed skew value resister 39 determines assumed skew values Q1 or Q0 and outputs the determined values to the selection circuit 40. A reset value 0 is supplied to the selection circuit 40 from a reset circuit 41. This skew estimator 18 can assume four values from 0 clock to 3 clock as skew. The same clock pulses as the sampling circuit and shift resistor 20 are supplied to the skew estimator 18.

Figure 10:
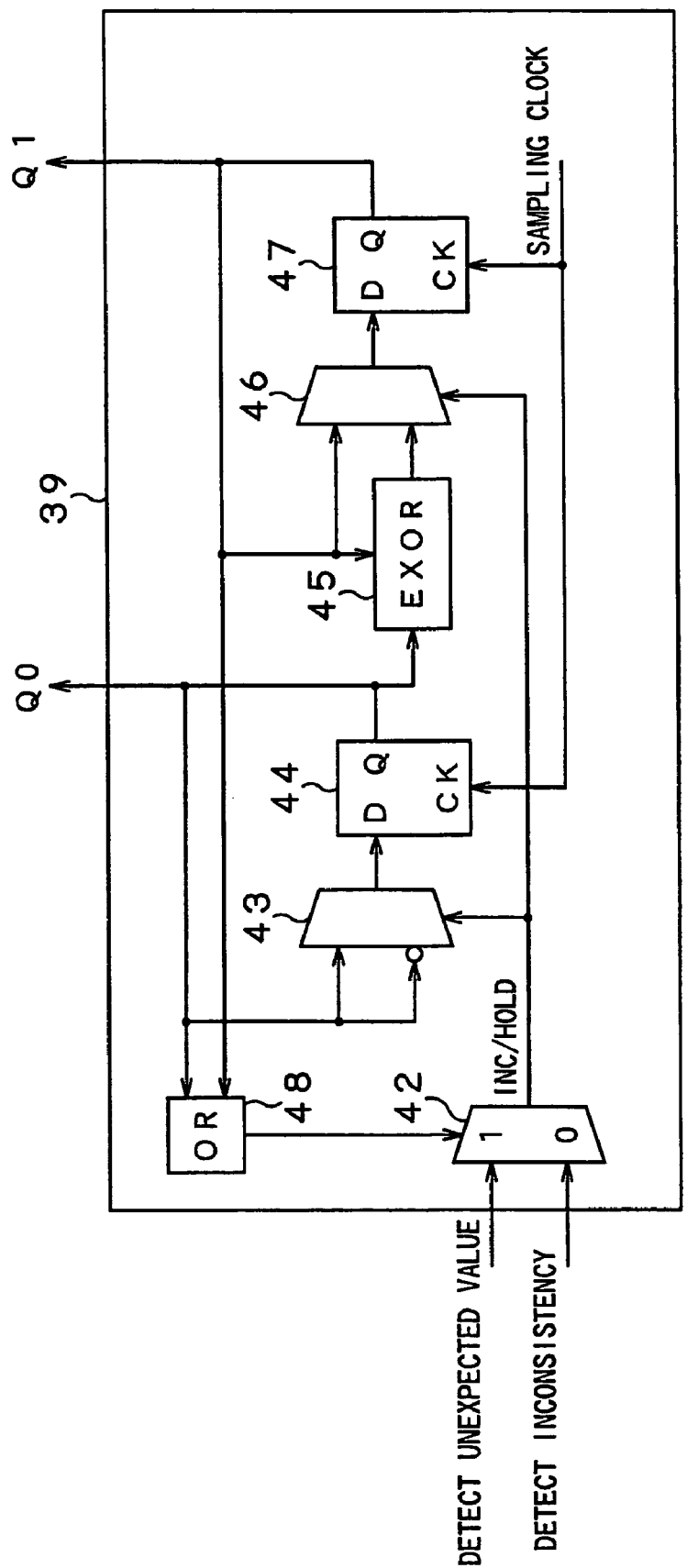
FIG. 10 is a block diagram for explaining an assumed skew value register circuit.

FIG. 10 shows a configuration example of the assumed skew value resister 39. This circuit outputs the comparison result of the comparator 16 or 17 that has received by a selection circuit 42 to selection circuits 43 and 46. FF 44 synchronizes with the sampling clock and sends the selection signal in the selection circuit 43, as Q0, to the external selection circuit 40 and ExOR gate 45 of the next stage. ExOR gate 45 obtains the XOR of the output of FF 44 and Q1, which is an output signal of FF 47, and sends the result to the selection circuit 46. FF 47 synchronizes with the sampling clock and sends the selection signal in the selection circuit 46, as Q1, to the external selection circuit 40. The assumed values Q1 and Q2 are input to OR gate 48. The output of OR gate 48 is input to the selection circuit 42.

That is, in this circuit, just one time of detecting inconsistency or unexpected value changes the assumed value Q1 or Q0. However, in some cases, it is preferable not to change the assumed skew value for the disturbance due to temporary noise. To cope with this problem, a buffer is provided for INC/HOLD signal to change the assumed value Q1 or Q0 only when the inconsistency or unexpected value is detected at a given frequency within a given period.

Figure 11:
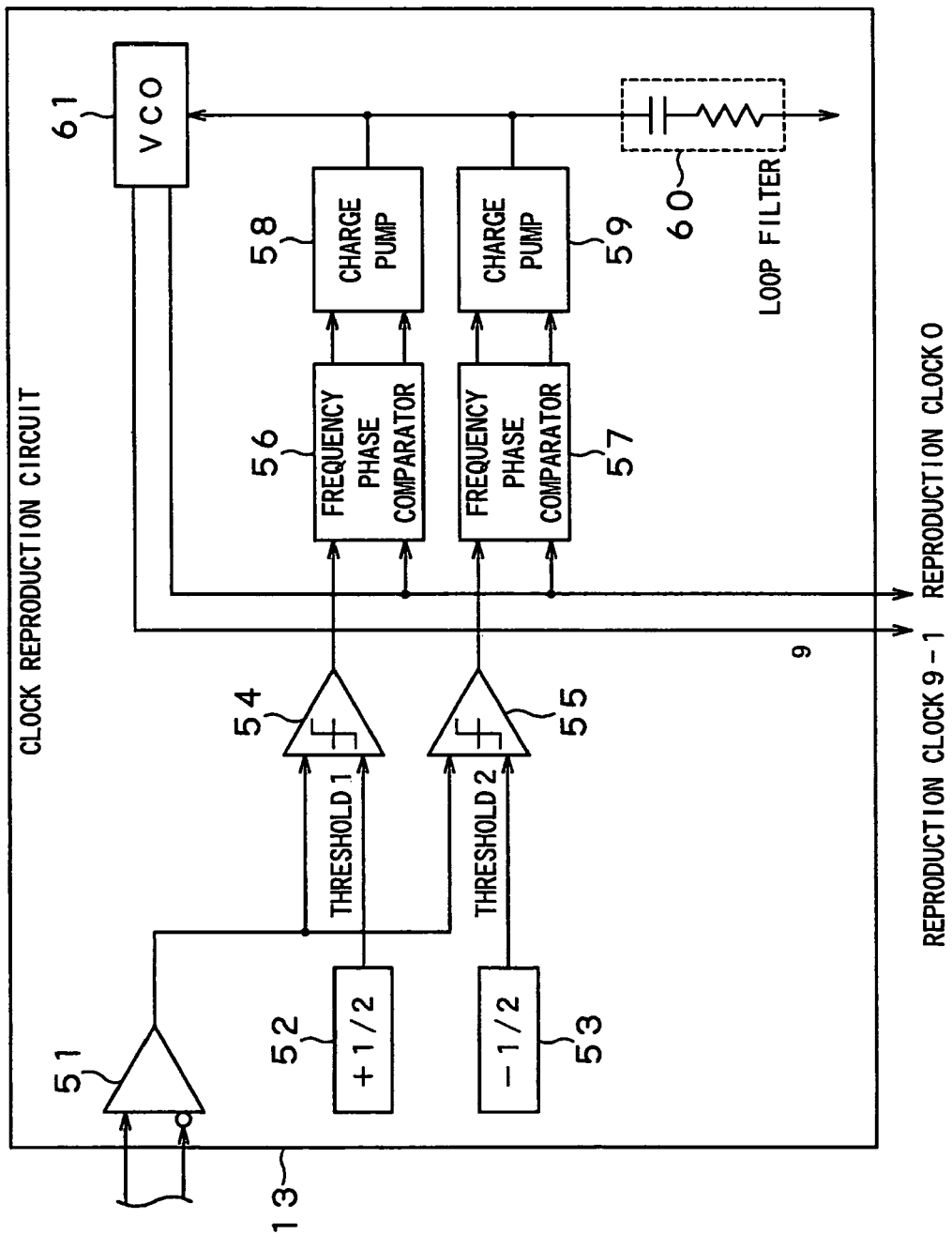
FIG. 11 is a block diagram for explaining a clock reproduction circuit suitably used in the data receiving device.

A configuration of the clock reproduction circuit 13 of the data receiving device 1 is shown in FIG. 11. FIG. 11 shows a configuration of a PLL circuit having a multi-phase clock VCO (Voltage Control Oscillator) 61 serving as the clock reproduction circuit 13. The receiving end differential voltage of the reference clock is amplified by a differential amplifier 51, compared, in a comparator 54, with the threshold $(+\frac{1}{2})$ that has been input from a threshold generation circuit 52, and compared, in a comparator 55, with the threshold $(-\frac{1}{2})$ that has been input from a threshold generation circuit 53, thereby generating two reference clocks. The reason for obtaining two reference clocks is that when the threshold is set in the differential voltage, a through rate of the differential voltage is extremely lowered in the vicinity of the threshold due to the influence of the differential skew, allowing the reference clock of the PLL to be susceptible to the influence of noise.

One of the two reference clocks and a 0-phase output of VCO are compared in the frequency phase comparator 56 to drive a charge pump 58. The other one of the reference clocks and the O-phase output of VCO are compared in the frequency phase comparator 57 to drive a charge pump 59. The outputs of the respective charge pumps are input, together with the output of a loop filter 60, to a VCO 61. As a result, the O-phase output of the VCO is locked to the vicinity of zero cross point of the differential signal.

Figure 12:
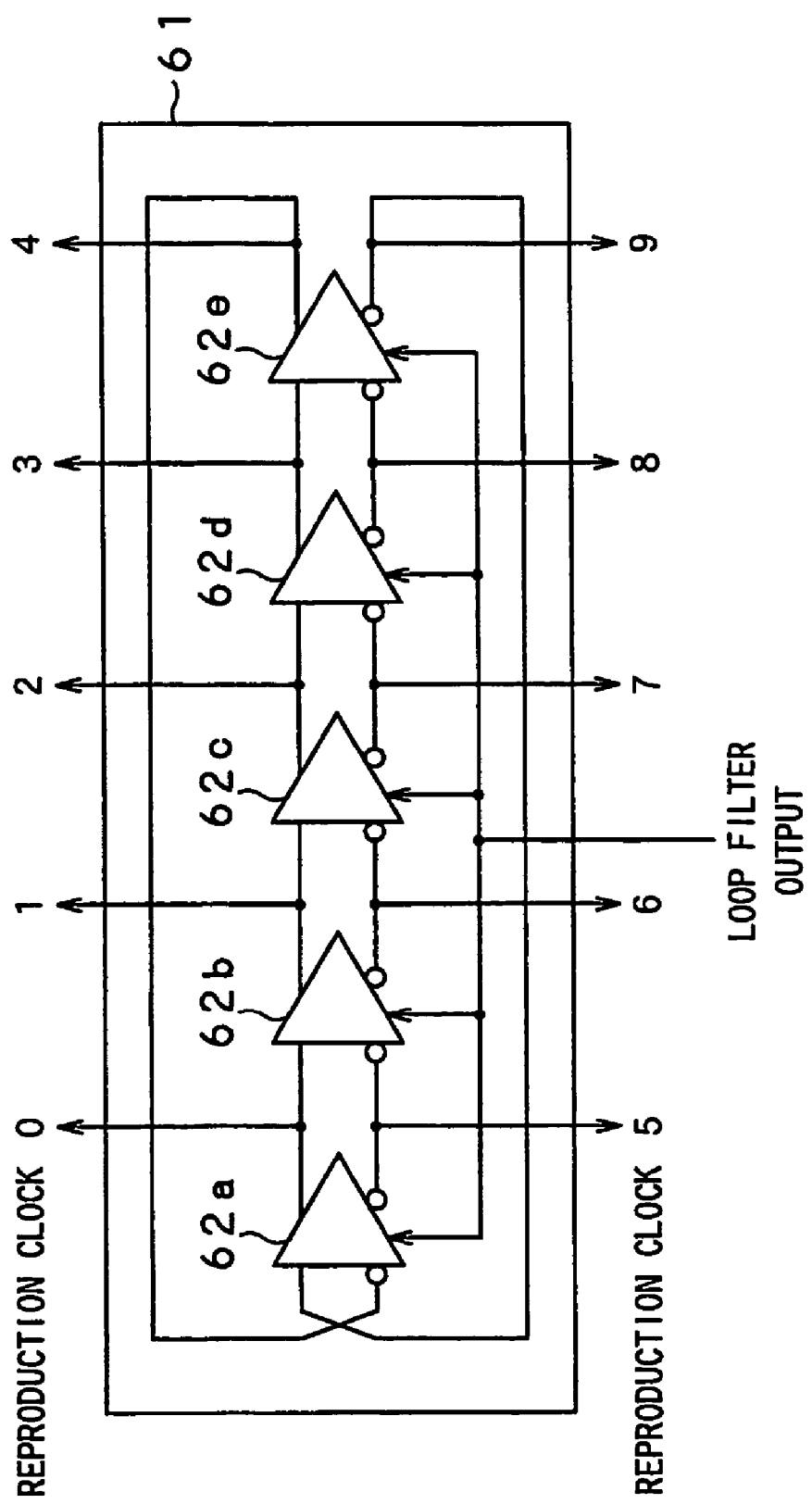
FIG. 12 is a block diagram for explaining a 10-phase output VCO circuit used in the clock circuit of FIG. 11.

FIG. 12 shows a configuration example of the multiphase clock VCO used in the clock reproduction circuit 13 of FIG. 11. The VCO 61 is a 10-phase output VCO circuit having voltage control differential delay circuits 62a, 62b, 62c, 62d, and 62e.

Figure 13:
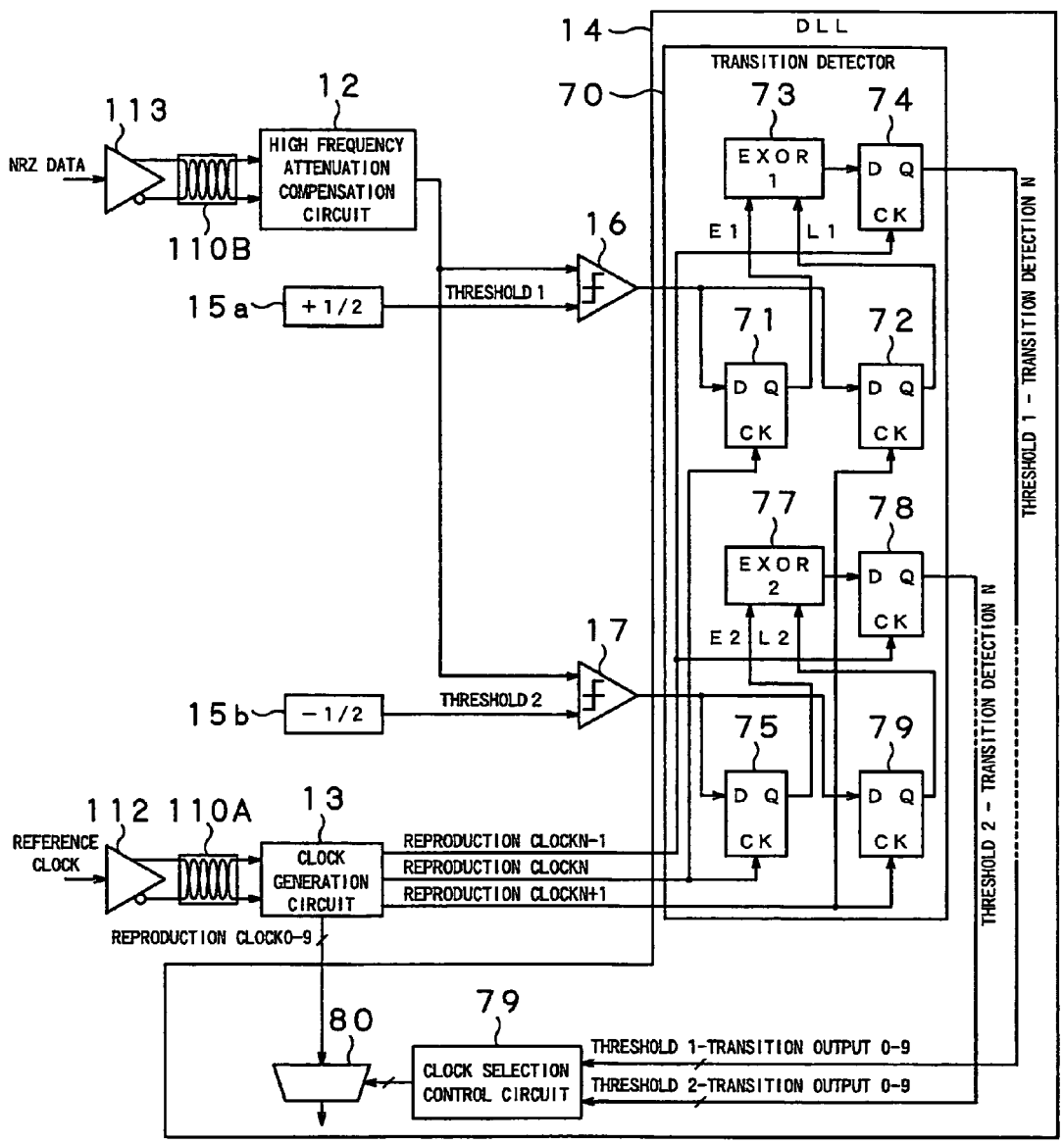
FIG. 13 is a block diagram for explaining a digital DLL that generates a sampling clock suitable for the data receiving device.

FIG. 13 shows a configuration of a digital DLL that generates a sampling clock suitably used in the present invention. The DLL 14 selects one from the 10-phase clocks supplied from the 10-phase output VCO circuit of the clock reproduction circuit 13 and outputs it as a sampling clock. The DLL 14 compares the value obtained by fetching the comparator output at a given phase, N clock and the value obtained by fetching at the next phase, N+1 clock, in order to select the reproduction clock serving as a sampling clock. When the inconsistency exists between the two values, it is determined that a transition region is present between the two clocks and transition detection signal is provided for one clock period. Transition detector 70 that detects the transition is shown in FIG. 13. Actually, ten transition detectors corresponding to N=0 to 10 are arranged in parallel.

The comparison result of the comparator 16 is input to input D of FF 71 and that of FF 72. The signal E1 output from Q of FF 71 and the signal L1 output from Q of FF 72 are input to ExOR circuit 73, and then output, as a transition detection output N at $+\frac{1}{2}$ (threshold 1), to a clock selection control circuit 79 through FF 74.

Similarly, the comparison result of the comparator 17 is input to input D of FF 75 and that of FF 76. The signal E2 output from Q of FF 75 and the signal L2 output from Q of FF 76 are input to ExOR circuit 77, and then output, as a transition detection output N at –½ (threshold 2), to a clock selection control circuit 79 through FF 78. Actually, the transition detection signals that have been detected by all transition detectors corresponding to N=0 to 10 connected in parallel are input to the clock selection control circuit 79.

As described above, the DLL 14 compares the value obtained by fetching the comparator output at a given phase, N clock and the value obtained by fetching at the next phase, N+1 clock, in order to select the reproduction clock serving as a sampling clock. When the inconsistence exists between the two values, it is determined that a transition region is present between the two clocks and transition detection signal is provided for one clock period.

Figure 14:
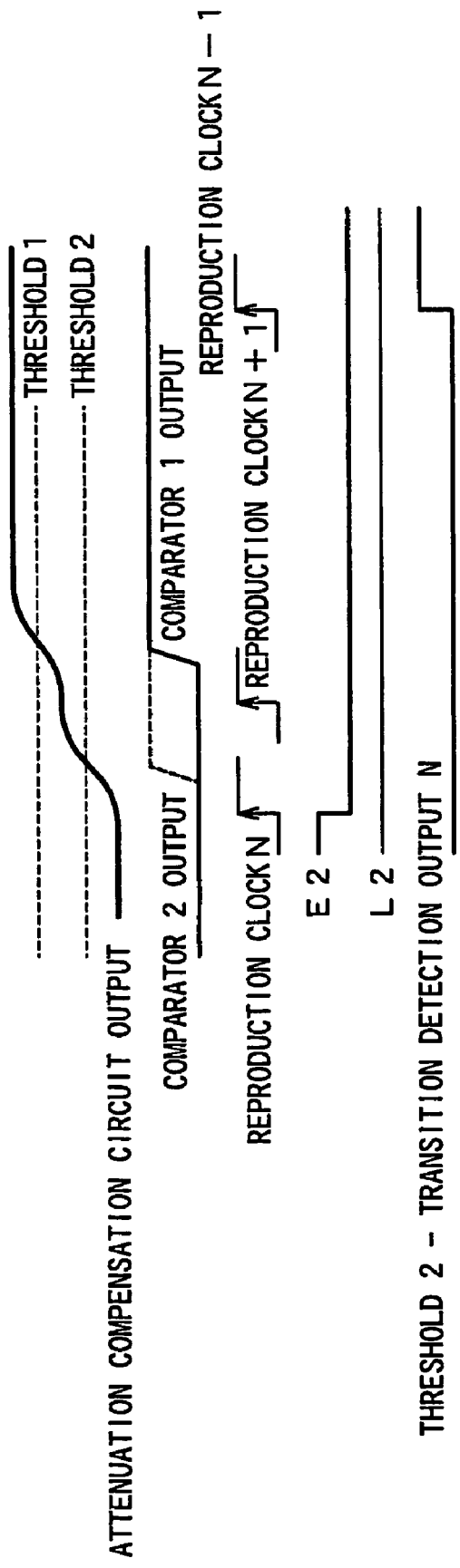
FIG. 14 is a view for explaining an operation timing of the digital DLL circuit of FIG. 13.

FIG. 14 shows the operation timing of the above DLL 14. The clock selection control circuit 79 counts detection signals, and selects a reproduction clock corresponding to the sampling choice 9 in the case where the counting result becomes, for example, an output eye pattern of the high frequency attenuation compensation circuit 12 shown in FIG. 6. The transition detector is a circuit including a number of flip-flops that operate according to a data transmission rate, and therefore requires a measurable amount of operating power. Therefore, it is possible to allow the DLL 14 to operate intermittently. The reason is that since a phase difference between the reproduction clock synchronized with the reference clock and NRZ data is based on the delay difference between the differential conductor pair 110A that transmits the reference clock and the differential conductor pair 110B that transmits the NRZ data, it is sufficient to follow a delay variation as gradual and slight as temperature drift for selecting the best suited clock. The DLL 14 may retain the selecting result of the clock obtained based on the information of transition detection output counted during operating time of the transition detector until the next operating time of the transition detector. Alternatively, instead of arranging ten transition detectors in parallel, only one detector may be used to count the transition detection outputs while scanning N.

EXAMPLE 2

Figure 15:
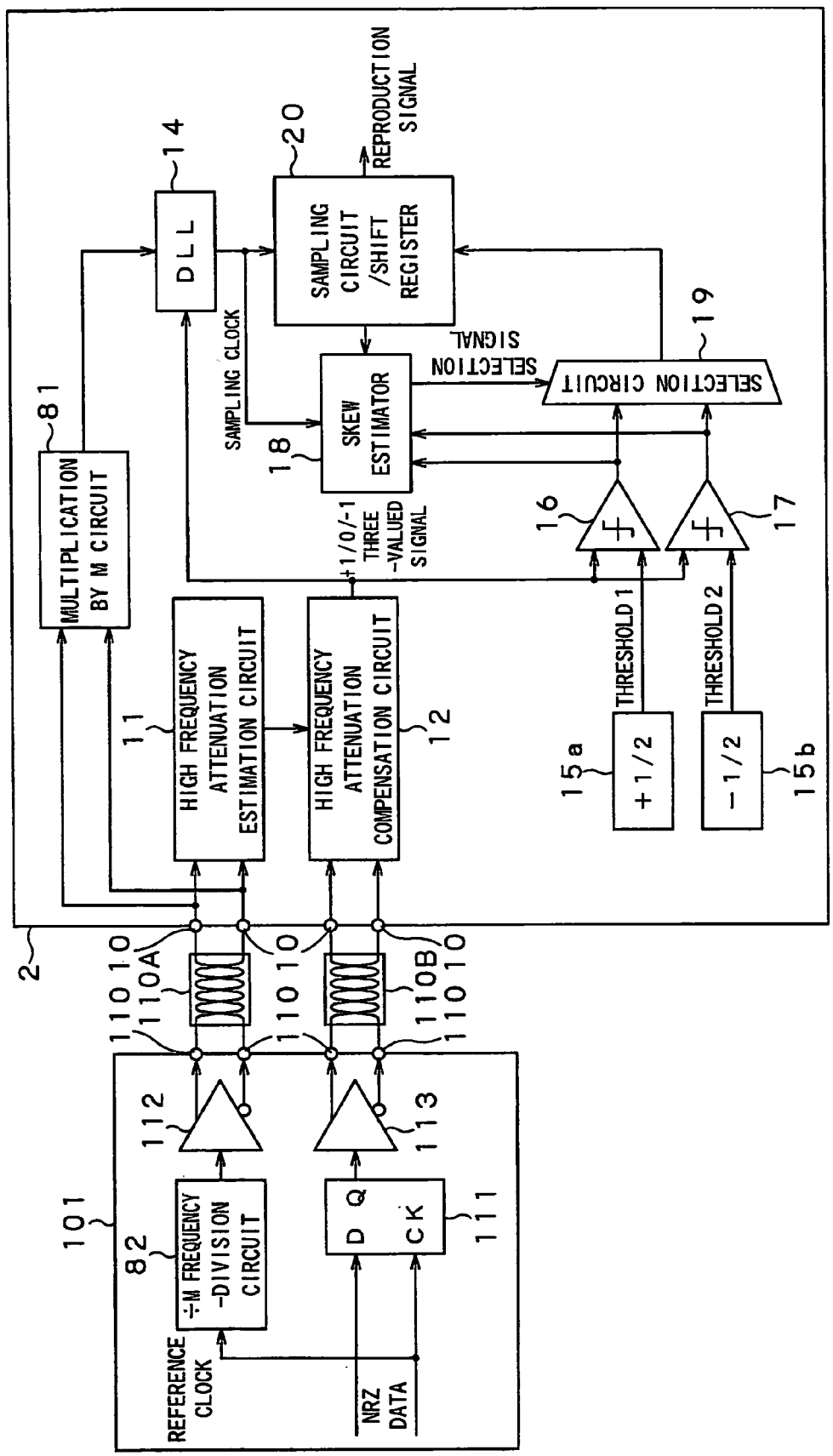
FIG. 15 is a block diagram for explaining a data receiving device shown as another concrete example of the present invention.

A second concrete example of the present invention is shown in FIG. 15. A data receiving device 2 of the second concrete example is featured in that a reference clock is not NRZ data itself, but a signal divided the clock signal by a fixed ratio M, and a multiplication by M circuit 81 is provided in place of the clock reproduction circuit 13. Therefore, a data transmitting device 101 includes an M frequency-division circuit 82 and thereby a clock signal of the NRZ data is frequency-divided by M. In FIG. 15, the same parts as those in FIG. 3 are indicated by the same reference numerals, and the description thereof will be omitted.

Figure 16:
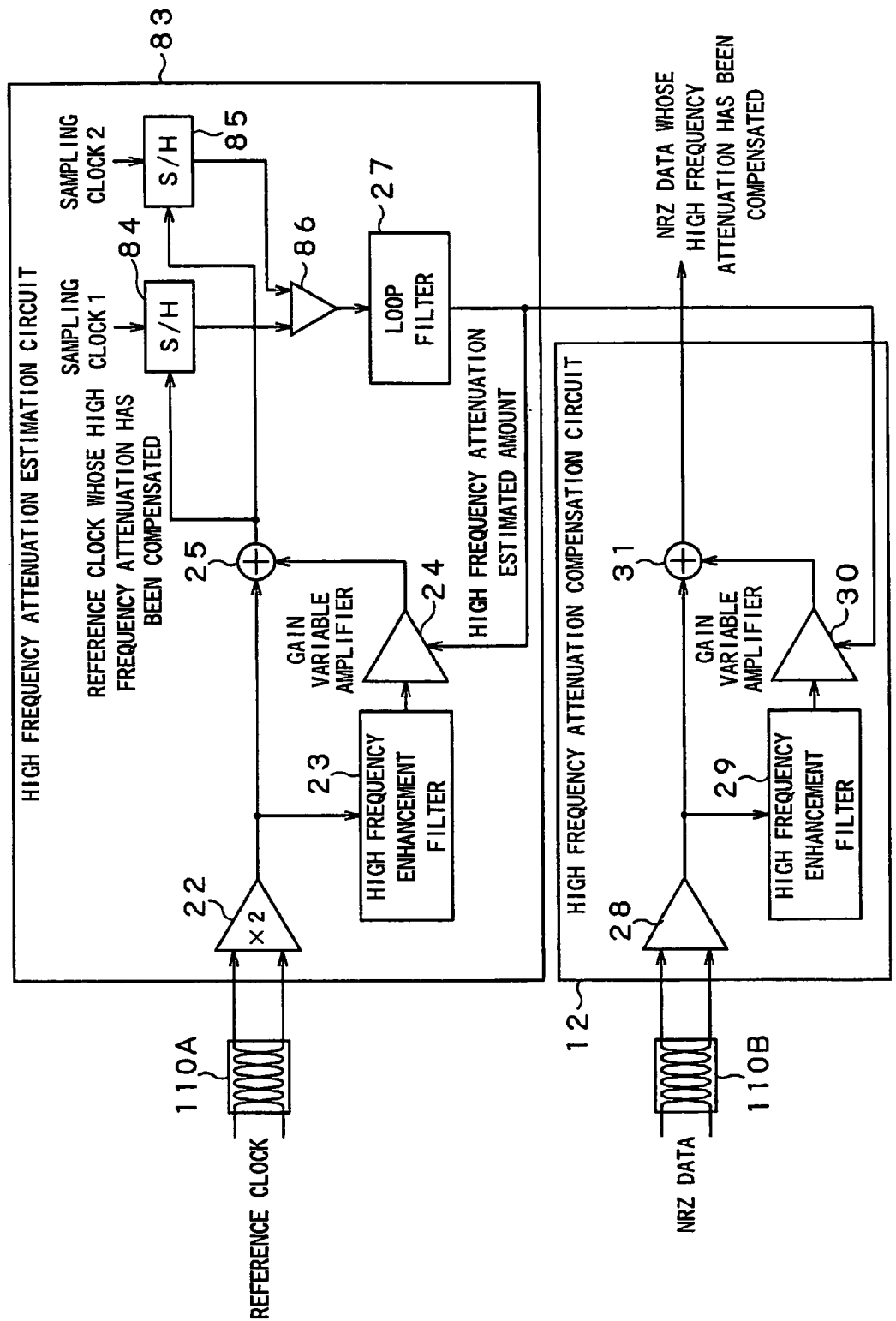
FIG. 16 is a block diagram for explaining a high frequency attenuation characteristics estimation circuit suitable for the data receiving device of FIG. 15.

FIG. 16 shows a configuration of a high frequency attenuation characteristics estimation circuit 83 suitably used in the second example. This circuit includes an S/H 84 and S/H 85 that sample the reference clock, in which high frequency attenuation has been compensated, output from the adder 25. The high frequency attenuation characteristics estimation circuit 83 amplifies the outputs of the S/H 84 and 85 through a differential amplifier 86, and supplies a loop filter 27 with the amplified outputs. That is, a couple of samplings are taken for the result obtained by weighted adding the signal whose high frequency component has been enhanced to the receiving end signal of the reference clock at the time zone where clock is 1 away from the transition time to feedback the voltage difference to additional weight of the high frequency enhanced component, thereby obtaining the optimum weight that compensates a high frequency attenuation. The obtained weight is defined as high frequency attenuation characteristics estimation amount.

Figure 17A:
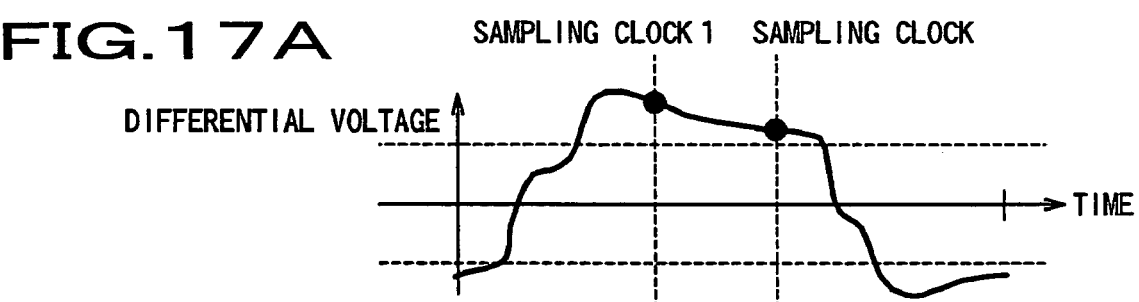
FIGS. 17A to 17C are views for explaining the operating principle of the circuit of FIG. 16.
Figure 17B:
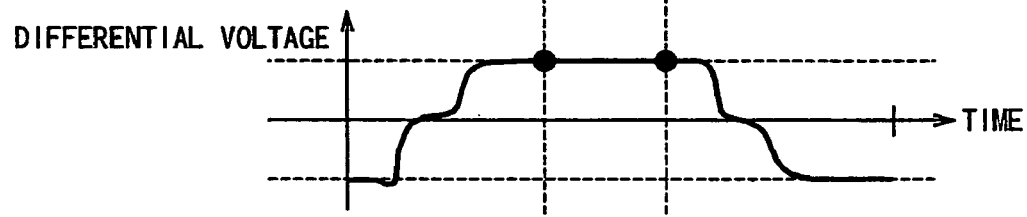
Figure 17C:
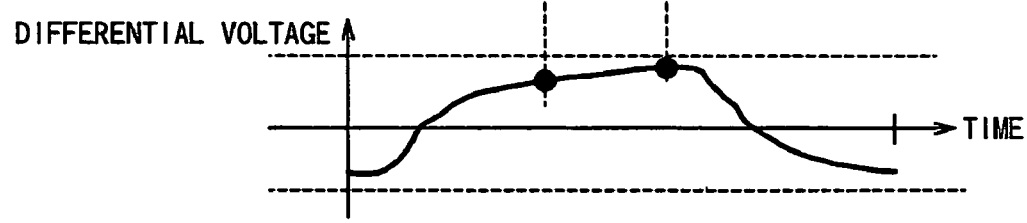

The operating principal of the circuit is based on the fact that when the additional weight of the enhanced high frequency component is an amount that compensates frequency attenuation, a constant voltage is obtained during the period at which the clock is 1 as shown in FIG. 17B, whereas when excess and deficiency exist in the weight, difference is made between the sample voltages as shown in FIGS. 17A and 17C.

As a result, a proper transmission signal can be reproduced from a waveform of a differential received signal that has been deteriorated by skew generated in the cable, in a long-distance transmission of high-speed digital data using the differential cable.

The present invention can be applied to a digital data transmission that propagates a clock or NRZ data as a differential signal through a differential conductor pair that has problems of: conflict between the transmission distance and transmission data speed during transmission of the differential signal; a limited difference in the propagation delay time caused due to the difference in physical conductor length and dielectric constant of coating; and inter-symbol interference in which transmission signals misaligned in time with each other are superposed on each other, due to the skew generated between the positive and negative signals that reach the receiving end with time difference.

What is claimed is:

1. A data receiving device that receives a reference clock signal transmitted through a first differential conductor pair and an NRZ signal transmitted through a second differential conductor pair equivalent to the differential conductor pair through which the reference clock signal is transmitted, comprising:
    estimation means for estimating attenuation characteristics in the first differential conductor pair serving as a transmission path of the reference clock signal, the reference clock having a known waveform transition pattern; and
    compensation means for compensating a transmission path attenuation of the NRZ signal based on the attenuation characteristics estimated by the estimation means,
    wherein the estimated attenuation characteristics of the reference clock through the first differential conductor pair is used to compensate for a high frequency attenuation characteristic of the NRZ signal transmitted through the second differential conductor pair.

2. The data receiving device according to claim 1, comprising:
    first comparison means for comparing a differential voltage whose transmission path attenuation has been compensated by the compensation means and a first threshold voltage;
    second comparison means for comparing a differential voltage whose transmission path attenuation has been compensated by the compensation means and a second threshold voltage;
    selection means for selecting, as a reproduction signal of the NRZ signal, the comparison result of either the first comparison means or second comparison means;
    delay means for delaying the reproduction signal selected by the selection mans based on a predetermined sampling clock signal; and control means for controlling the signal selection in the selection means in accordance with a delay amount in the delay means.

3. The data receiving device according to claim 2, comprising phase synchronization means for phase-synchronizing the reproduction signal of the NRZ signal selected by the selection means and a clock signal frequency-synchronized with the reference clock signal.

4. A data receiving device that receives an NRZ signal transmitted through a differential conductor pair, comprising:

multiplication means for receiving and multiplying a frequency-divided signal of a clock of the NRZ signal;

estimation means for estimating attenuation characteristics in the differential conductor pair serving as a transmission path of the frequency-divided signal;

compensation means for compensating a transmission path attenuation of the NRZ signal based on the attenuation characteristics estimated by the estimation means;

first comparison means for comparing a differential voltage whose transmission path attenuation has been compensated by the compensation means and a first threshold voltage;

second comparison means for comparing a differential voltage whose transmission path attenuation has been compensated by the compensation means and a second threshold voltage;

selection means for selecting, as a reproduction signal of the NRZ signal, the comparison result of either the first comparison means or second comparison means;

delay means for delaying, as a reference clock signal, a signal obtained by multiplying, using the multiplication means, the reproduction signal selected by the selection means; and control means for controlling the signal selection in the selection means in accordance with a delay amount in the delay means.

* * * * *